Figure 1:
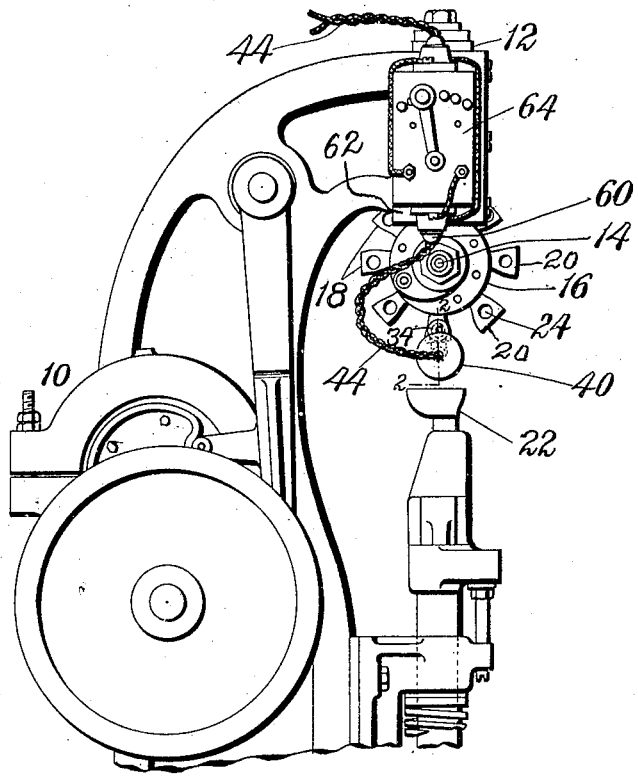

B. S. LEE.
STAMPING MACHINE.
APPLICATION FILED SEPT. 6, 1917.

1,327,050.  Patented Jan. 6, 1920.

INVENTOR.
Bernard S. Lee

UNITED STATES PATENT OFFICE.

BERNARD S. LEE, OF BEVERLY, MASSACHUSETTS, ASSIGNOR, BY MESNE ASSIGNMENTS, TO UNITED SHOE MACHINERY CORPORATION, OF PATERSON, NEW JERSEY, A CORPORATION OF NEW JERSEY.

STAMPING-MACHINE.

1,327,050.  Specification of Letters Patent.  Patented Jan. 6, 1920.

Application filed September 6, 1917. Serial No. 190,022.

*To all whom it may concern:*

Be it known that I, BERNARD S. LEE, a citizen of the United States, residing at Beverly, in the county of Essex and State of Massachusetts, have invented certain Improvements in Stamping-Machines, of which the following description, in connection with the accompanying drawings, is a specification, like reference characters on the drawings indicating like parts in the several figures.

This invention relates to stamping machines such as are employed for impressing characters or other marks upon various objects, as portions of shoes, and more particularly does it relate to those machines in which a heated die is utilized for making the impression. Heretofore it has been customary in these machines to apply an electrical heating device to the support for the die, for example to the spindle upon which moves the turret furnishing the mounting for the die or dies. This arrangement requires the expenditure of considerable energy to raise the temperature of the parts which conduct the heat to the dies themselves and much of this is radiated before it reaches the die in use and is therefore wasted.

An object of this invention is to so arrange machines of the above-mentioned character that this loss of energy may be avoided. Another object is to provide a heating device which will be convenient and durable as well as economical. With these objects in view I place the heating means in direct contact with the die itself and arrange it in such a manner that it most effectively imparts its heat to the working surface thereof. In accordance with another feature, the heating element is made separable from the die and is so connected with the source of energy that it may readily be removed from one die and brought into coöperation with another, thus adapting it for use in machines in which a plurality of dies are mounted together, any one of which may be rendered effective at the will of the operator. Since such a heating element must be handled by the operator, I so arrange it that its temperature will not cause discomfort and that the heating unit itself and its supply conductors and connections will not be liable to injury. Moreover, improved means are provided for making the connections between the leading-in conductors of the unit and the supply conductors.

A machine embodying this invention is illustrated in the accompanying drawings, in which—

Figure 2:
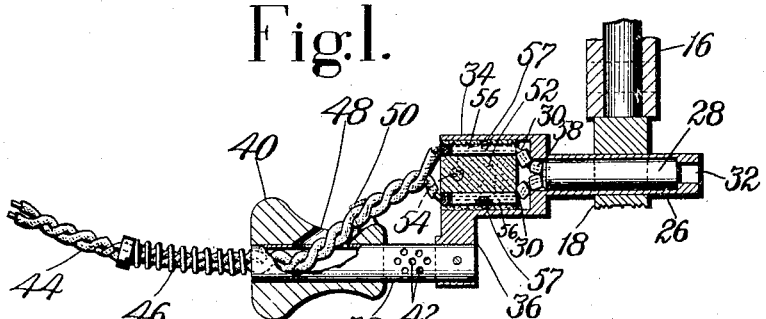

Figure 1 is a side elevation of the upper portion of a stamping machine with my invention applied thereto, and Fig. 2 is an enlarged section on the line 2—2 of Fig. 1.

The numeral 10 designates the frame of a well-known stamping machine in connection with which I have chosen to describe my invention. Mounted for reciprocation at the upper portion of the frame is a head 12 carrying a spindle 14, upon which is mounted to rotate a turret 16 shown as in the form of a disk having at its periphery radial bores to receive the shanks of dies 18. By turning the turret on the spindle the working face 20 of any one of the dies may be brought into operative relation with a horn or work support 22 rising from the lower portion of the frame. In the body of each die is an opening 24 extending laterally therethrough, parallel and in proximity to its working face. This opening is adapted to receive the heating device. This device is preferably electrical and may be inclosed in a casing conveniently consisting of a tubular casting having cylindrical portions of different diameter. The smaller portion 26 is of such internal diameter that there may be inserted within it an electrical heating unit 28 of any desired construction provided with leading-in conductors 30. The unit is introduced into the recess in the portion 26 through the opening in the larger portion 34 of the casing and is seated against an annular shoulder at the opposite end of the portion 26. Since there is sometimes a tendency for the unit to stick within the casing, to facilitate its removal for replacement if burnt out, I provide at the end adjacent to the shoulder an opening 32 through which a tool may be inserted to force the unit out. The portion 34 of the casing, though of larger diameter than the portion containing the unit, is shorter axially and has at its outer extremity a projection 36 shown as extending at right angles from the casing. This projection has an opening to receive a tube 38, preferably lying parallel to the casing axis and having mounted upon its outer end and spaced from the projection 36, a handle 40 which may be of some material conducting heat poorly, as wood. In the wall of the tube between the handle and projection are perforations 42, giving a circulation of air for the purpose of cooling the tube and preventing the heat from reaching the handle. Flexible supply conductors, which I have shown in the form of a twisted pair 44, lead through a spiral spring protector 46 fixed to the end of the tube 38 and then through an inclined opening 48 in the side of the handle toward the casing and beneath a retaining strap 50, from which point they may enter the portion 34 of the casing. To connect these supply conductors with the leading-in conductors of the unit a connecting device is located within the casing portion 34, this consisting, as illustrated, of a block 52 of insulating material, for example fiber, in which are two passages extending parallel to the axis of the casing and in proximity to the inner wall of the portion 34. The block may be secured in place in the casing by a screw 54 threaded through the casing wall. In each of the passages is a connecting sleeve 56, into the opposite ends of which the supply and leading-in conductors are introduced and there soldered or otherwise secured. The sleeves 56 may be retained against longitudinal movement in the passages by screws 57 threaded into them and extending into openings in the block. Between the inner end of the block 52 and the adjacent head of the casing portion 34 is a space to receive the leading-in conductors and their insulating covering, which I have illustrated in the form of beads 58. The flexible supply conductors 44 are of such length that the heating device may readily be placed in any of the die openings and at their ends opposite the device are provided with a connecting device, as a plug 60, for engagement with terminals furnished by a receptacle 62. This receptacle may be mounted upon a rheostat 64 by which the current to the heating device is varied to give the desired temperature.

In assembling the elements of the heating device, the supply conductors are drawn through the protector, the tube 38, the opening 48 in the handle and beneath the retaining strap 50 and are joined to the leading-in conductors of the unit by means of the sleeves 56 within the insulating block 52. Being thus connected, the unit and connecting device are placed within their respective portions of the casing and secured by the screw 54. Now, when any one of the dies carried by the turret is brought into alinement with the horn, the portion 26 of the heating device may be inserted in the die opening, and when current is supplied to the unit the heat generated thereby will be communicated directly to the working face, there being practically no loss by radiation from other portions of the die and none from intermediate elements. When the operator desires to use another die, it is merely necessary to remove the heating device from the one previously employed and upon bringing the new die into position apply the device to the opening therein. The casing containing the unit and connecting device perfectly guards them against injury in handling, and the manner in which the handle is mounted and insulated against heat protects both the operator manipulating it and the supply conductors which it guides.

Having described the invention, what I claim as new and desire to secure by Letters Patent of the United States is:

1. In a machine of the class described, a die holder, a die carried by said holder, said die having an opening extending laterally therethrough parallel and in close proximity to its working face, and a heating device adapted to be received in and readily removable from said opening and operating when positioned in the die to conduct heat directly to the working face of said die.

2. In a machine of the class described, a die holder, a die carried by said holder, said die having an opening extending laterally therethrough substantially parallel and in close proximity to a working face, a heating device adapted to be received in said opening and operating when positioned in the die to conduct heat directly to said working face of the die, said heating device including an electrical heating unit, and flexible supply conductors for the unit permitting unrestricted movement of the die.

3. In a machine of the class described, a die holder, a die carried by said holder and having an opening in close proximity to a working face of the die to receive a heating device, a heating device comprising a casing adapted to be received in said opening, an electrical heating unit in said casing, and flexible conductors connecting said unit with a source of electrical energy, said heating device operating to deliver heat directly to said working face of the die.

4. In a machine of the class described, a die holder, a die carried by said holder and having an opening to receive a heating device one wall of which opening is in close proximity to a working face of the die to cause heat to be conducted directly to said working face of the die, a heating device adapted to be received in the opening in the die, said heating device comprising a casing, an electrical heating unit in said casing, and flexible conductors connecting said unit with a source of electrical energy, the heating device being freely detachable from the die as a unit and offering no obstruction to unrestricted movement of the die when the heating device is in its operative position.

5. In a stamping machine, a plurality of dies any one of which may be brought into stamping position, and a heating device so constructed and arranged that it may be applied interchangeably to any one of the dies.

6. In a stamping machine, a plurality of dies each provided with an opening, any one of which dies may be brought into stamping position, and an electrical heating device so constructed and arranged that it may be introduced into the opening of any of the dies.

7. In a stamping machine, a work support, a die support, and a plurality of dies carried thereby, said die support being movable to bring any one of the dies into coöperation with the work support, and a heating device mounted upon the machine for direct contact with any one of the dies.

8. In a stamping machine, a work support, a rotatable turret having a plurality of dies movable in the rotation of the turret into alinement with the work support, electrical terminals carried by the machine, an electrical heating device adapted to contact with any one of the dies, and flexible conductors connecting the terminals and device.

9. In a machine of the class described, a support, a die mounted thereon and being provided with an opening, a heating device comprising a casing having a portion adapted to enter the die opening and to be carried therewith by the support, an electrical heating unit situated in the casing, and a handle projecting from the casing and serving to change the relation of the casing to the die.

10. In a machine of the class described, a die provided with an opening, a heating device comprising a casing having a portion adapted to enter the die opening and another portion, an electrical heating unit situated in the first-named casing portion, a connecting device situated in the other portion, and supply conductors entering the connecting device.

11. In a machine of the class described, a die provided with an opening, a heating device comprising a casing having a portion adapted to enter the die opening and a projecting portion, an electrical heating unit situated in the first-named casing portion, a handle fixed to the projecting portion and being offset therefrom, and connections extending from the unit through the projecting portion of the casing to the handle.

12. In a machine of the class described, a die provided with an opening, a heating device comprising a casing having a portion adapted to enter the die opening and a projecting portion, a tube carried by the projecting portion, an electrical heating unit situated in the first-named casing portion, and a handle fixed to the tube, there being perforations in the tube between the handle and projecting portion.

13. A heating device comprising a casing having connected portions, a heating unit situated in one portion and having leading-in conductors, supply conductors, a block of insulating material situated in the other portion of the casing and being provided with passages, and connecting sleeves for the conductors situated in the passages.

14. A heating device comprising a tubular casing having connected portions of different diameter, a heating unit situated in the smaller portion of the casing and having leading-in conductors, there being an angular projection from the larger portion, a handle carried by the projection, supply conductors passing through the handle, and connecting means for the conductors situated in the larger portion of the casing.

15. A heating device comprising a tubular casing having connected portions of different diameter, a heating unit situated in the smaller portion of the casing and having leading-in conductors, there being an angular projection from the larger portion, a tube secured to the projection and extending in the opposite direction from the casing, a handle upon the outer extremity of the tube, said tube being perforated between the handle and casing, supply conductors passing through the handle, and connecting means for the conductors situated in the larger portion of the casing.

In testimony whereof I have signed my name to this specification.

BERNARD S. LEE.